(12) United States Patent
Daansen

(10) Patent No.: US 6,286,732 B1
(45) Date of Patent: Sep. 11, 2001

(54) DISPENSER VALVE WITH INCREASED FLOW CAPACITY

(76) Inventor: Warren S. Daansen, 39 Orange St., Nashua, NH (US) 03060

(*) Notice: Subject to any disclaimer, the term of this patent is extended or adjusted under 35 U.S.C. 154(b) by 0 days.

(21) Appl. No.: 09/383,832

(22) Filed: Aug. 27, 1999

Related U.S. Application Data

(60) Provisional application No. 60/098,347, filed on Aug. 28, 1998.

(51) Int. Cl.$^7$ .................................................. B65D 5/72
(52) U.S. Cl. ................................................ 222/496; 137/846
(58) Field of Search ........................... 222/496, 518; 251/149.1, 149.7; 137/515.7, 846

(56) References Cited

U.S. PATENT DOCUMENTS

| | | |
|---|---|---|
| 4,130,224 | 12/1978 | Norman et al. . |
| 4,143,853 | 3/1979 | Abramson . |
| 4,394,938 | 7/1983 | Frassanito . |
| 4,512,501 | 4/1985 | Foster . |
| 4,515,294 | 5/1985 | Udall . |
| 4,607,764 | 8/1986 | Christine . |
| 4,621,749 | 11/1986 | Kanfer . |
| 4,705,195 | 11/1987 | Heck . |
| 4,722,372 | 2/1988 | Hoffman et al. . |
| 4,878,774 | 11/1989 | Karasin et al. . |
| 4,887,742 | 12/1989 | Roethel et al. . |
| 5,265,772 | 11/1993 | Bartasevich et al. . |
| 5,401,148 | 3/1995 | Foster et al. . |
| 5,501,372 | 3/1996 | Daansen . |

*Primary Examiner*—Philippe Derakshani
(74) *Attorney, Agent, or Firm*—Scott J. Asmus; Vernon C. Maine

(57) ABSTRACT

The invention in the simplest form is a dispenser valve with an increased flow capacity. The device is particularly suited for dispensing liquids, and has a plurality of individual thin and streamlined elevated standoffs that serve as the spring seat, lowering flow losses and providing a larger flow path area or particulate matter included in the liquid. In addition, the ball check valve chamber is funnel shaped, creating an efficient flow for the dispensing liquid regardless of the viscosity or particulate of the liquid. The unit increases discharge capacity, reduces clogging, improves efficiency, and allows the unit to dispense highly viscous and gritty materials.

15 Claims, 7 Drawing Sheets

DISPENSER VALVE WITH INCREASED FLOW CAPACITY

CROSS REFERENCE TO RELATED APPLICATIONS

This application claims priority under United States Provisional Patent Applications No. 60/098,347 filed on Aug. 28, 1998, which is incorporated herein by reference for all purposes.

BACKGROUND OF THE INVENTION

1. Field of the Invention

The present invention relates to an improved liquid dispensing apparatus, more specifically, a dispenser with a valve assembly having an unrestricted fluid path, and an overall greater area of flow capacity through the dispenser valve. More specifically, the present invention is for a liquid dispenser wherein the dispenser valve incorporates an elevated streamlined spring seat stand-off and a funnel shaped chamber.

2. Background Art

Liquid and semi-liquid dispensers are used in numerous applications and are used to dispense metered portions of cremes, lotions, soaps, and similar materials. A typical dispenser allows the user to obtain a specific amount of liquid matter with minimal ease. Manual and automatic dispensing systems are common in the industry.

The manual dispensers utilize levers and other mechanical assemblies wherein the user must provide some physical contact with the unit in order to dispense the liquid. Automatic dispensers are becoming increasingly popular, and operate with a variety of electrical and electro-mechanical components to automatically dispense the liquid after triggering some sensory input. Once the sensor mechanism is triggered, a mechanical means is still required to force out a metered quantity of liquid.

Within the field of liquid dispensers, there are many types of dispensers. The most common and cost effective is the bag-in-box system, wherein the liquid comes in a no-leak pouch with a pump tip and is disposable when no liquid remains in the pouch. This system is a closed system, and all the air is removed from the pouch during manufacturing. The bag collapses upon itself once the liquid is evacuated, minimizing waste disposal. The closed system has many advantages, including being a more sanitary system. The standard size pouch is 800 ml, but other sizes are in use, including 1000 ml and 1200 ml, and larger sizes are possible, as they are more economical to operate. It is a necessary requirement that the cost to produce a bag-in-box system be kept to a minimum, while still delivering consistent results. These dispensers are installed in many public facilities and are subject to extreme wear and tear, thus they must also be robust and relatively maintenance-free. As a disposable unit, if the bag-in-box system malfunctions, the system is thrown out along with any remaining liquid in the pouch.

Other dispensers use cartridges or re-fillable containers. The cartridges must be pierced, are generally not refillable, and produce greater waste. Both cartridges and refillable containers introduce air into the system, aiding the production of bacteria and mold. The cost and administrative complexity in using these other forms of dispensers, as well as the decreased sanitary condition limits their market appeal. Regardless of the type of housing for the liquid, whether pouch, canister, cartridge or container, the liquid must still be dispensed through a dispenser valve assembly.

The liquid soap industry has numerous brands and categories of soaps. The viscosity and particulate content are also subject to extreme variations. There is an array of particulate matter that can be added to liquid soaps to form a grit soap compound that is more effective in cleaning. The most common grit material is plastic microspheres, although other materials such as clay, walnut shells and corn cobs have also been used. Besides the variations of compounds used to form grit soap, the size of the grit also varies.

There are several lines of liquid soaps with synthetic particles, namely plastic balls, that constitute grit compounds. The size of the particulate varies, and a series of products include Microgrit 40, Microgrit 60, and Microgrit 70. The increased consumer demand for grit in liquid soaps has led to an increase in malfunctions in existing dispensers.

There has also been a consumer demand for antimicrobial soaps, and the industry has reacted by adding creating new compounds with anti-bacterial properties. These antimicrobial soaps are available with or without grit and have certain characteristics and viscosity differences as compared to standard liquid soap.

Besides liquid soap, other compounds that are used in liquid dispensers include body and hair shampoo, hand creme solutions, lotion soaps, and shaving creme. Any flowable liquid is capable of being dispensed. Prior art designs are generally not effective in dispensing viscous liquids.

In a typical bag-in-box operation, a user depresses a lever or controller. This applies pressure to the liquid in the collapsible pouch that exerts fluid pressure against the ball in the ball check valve. If the pressure is sufficient, the ball is displaced, and the liquid flows around the ball and into the ball check valve chamber. The liquid flows into the space between the spring and the interior wall of the ball check valve chamber. Once the chamber is sufficiently full, the liquid is forced through the compressed spring and out through the lower fitment hole and through the nozzle.

Many of the current dispensers cannot adequately handle the grit, grit compounds, or viscous liquids. The dispenser valves have a narrow point or restricted passage that limits the size of the particulate matter that can pass freely and generally impedes viscous liquids. In most cases, this narrow area is directly before the exit nozzle, at the spring seat.

A common problem with most bag-in-box dispensers is that the dispenser valve tends to clog and become unusable after a number of manipulations. Once the pump tip becomes clogged, the entire pouch and pump tip is normally thrown out, regardless of the amount of liquid remaining in the pouch. The expenditure in time and materials is significant due to the number of dispensers in the market.

In order to reduce the aforementioned problems, attempts have been made to produce an efficient and cost-effective dispensing system. The prior art systems have general short-comings and do not adequately address or correct these problems.

The pump tip in U.S. Pat. No. 5,501,372 is an improved tip design, but as shown in FIG. 5, the liquid has a limited exit point that restricts the liquid flow. The spring contacts the flush spring seat, creating a bottleneck in the dispensing process. The liquid is substantially forced through the center of the spring in order to exit out of the nozzle tip. In addition, the flat surface of the spring seat provides a surface for collecting debris and otherwise facilitating clogging of the nozzle, especially when particulate matter is mixed with the liquid.

U.S. Pat. No. 4,130,224 is another dispensing apparatus, wherein the ball check valve is held in place by a spring, with the spring seat perpendicular to the spring, as illustrated in FIG's 3, 4, 5, and 6. When the lever is pressed, the fluid is compressed, creating a pressure that exceeds the spring tension. The ball is forced away from the ball seat and fluid flows around the ball and into the inner chamber. The exit nozzle is smaller in dimension than the diameter of the inner chamber, and the spring seat is on the upper end of the exit nozzle, with the spring contacting the spring seat. The liquid must go through the spring to exit the nozzle.

A similar ball check valve is disclosed in FIG. 5 of U.S. Pat. No. 4,394,938 ('938), wherein the '938 invention depicts the arrangement of the ball contacting the ball seat, and held in place by the spring. The spring is perpendicular to the spring seat, which is a substantially flat surface. When the ball is displaced from the ball seat, the liquid is forced around the ball. The path of the liquid is primarily down the cross sectional area outside the spring until the liquid contacts the flattened surface of the spring seat, where the liquid is then forced to exit through the center of the spring.

A similar ball check arrangement is shown in FIG. 10 of U.S. Pat. No. 4,515,294. The spring is retained within a tube, and a smaller diameter inner tube forms the lower end of the spring seat. Once the ball is displaced from the ball seat, the liquid flow is obstructed and must be diverted through the center of the spring before it enters the inner tube. In yet another dispenser device, U.S. Pat. No. 4,722,372 in FIG. 7 shows the spring seat flush and perpendicular to the spring as in previous examples.

U.S. Pat. No. 4,621,749 shows another ball check valve, where the lower end of spring chamber has a slight angle at the lower portion as shown in FIG. 10. However, the liquid must still flow around the spring in order to exit the cavity. In addition, the location of the angle is at a point where the flow is already restricted. Another example of an angled portion is shown U.S. Pat. No. 5,265,772 in FIG. 9. In both these figures, the bottom coil was not flat, but was angled like the other coils and seated in the chamber accordingly. Neither discloses nor suggests any significance relating to fluid flow characteristics, and neither discusses or infers any advantages to angled chamber design or elevated standoffs.

A different valve dispensing assembly is illustrated in U.S. Pat. No. 4,143,853, wherein a rubber disc with a slit is used as the means of gating the liquid flow. In operation, the normally closed slit is opened when a force is applied to the edges of the disc by the engaging assembly located on the outer periphery of the disc. In this invention, the planar seat surfaces are required in order to function properly. This invention is specifically intended for use as a catheter. U.S. Pat. No. 4,394,938 employs a similar design, wherein a slit diaphragm is used as the gating mechanism for dispensing metered portions.

Another design is disclosed in U.S. Pat. No. 4,607,764, where an elastomeric band functions as the check valve and allows a metered portion of liquid to be dispensed. This invention creates a flow channel by having specific openings and indents within which the fluid passes.

What is needed is a dispenser pump tip design that eliminates restriction and obstructions in the liquid flow. Such a design should allow greater cross sectional flow into the nozzle. This design would eliminate the need for the liquid to be forced to enter the spring center, and should greatly increase the flow capacity of the dispenser. An additional feature of such a design would be the ability of the dispenser to handle grit products and viscous liquids, and reduce the clogging evident in present designs. This design must also be cost effective to manufacture and implement, and allow for easy incorporation into current dispenser designs.

SUMMARY OF THE INVENTION

The present invention has been made in consideration of the aforementioned background. It is therefore an object of the present invention to provide a liquid valve dispenser assembly with greater flow capacity and greater cross-sectional area for the liquid flow.

An object of the present invention is to provide a dispenser valve that is capable of dispensing products containing large size grit particulate and properly dispense viscous liquids, including those with particulate matter.

Another object is to provide a soap dispenser valve that is less likely to clog.

An additional object is to provide an improved dispenser valve that is cost effective to manufacture, and can be incorporated into existing manufacturing lines and existing products.

An additional object is to provide a funnel-shaped path for the liquid flow within the dispenser valve chamber.

Yet another object is to provide a dispenser valve with fewer obstructions or restrictions in the path flow by incorporating elevated standoffs for the spring seat. A further is to provide streamlined standoffs that minimize fluid turbulence and direct the fluid flow.

Another object is to increase efficiency and productivity by reducing the number of clogged dispensers. Most bag-in-box soap dispensers cannot be easily repaired once they become clogged and the pouch and remaining soap must be thrown away along with the pump tip. The present invention possesses a high commercial value because it significantly reduces the amount of wasted product and maintenance.

An additional object of the invention is to limit the strainer effect of the spring in removing particulate matter.

An object of the invention is a valve dispensing assembly comprising a ball check valve chamber with a first chamber end and a second chamber end, a ball seat at the first chamber end, a ball contacting the ball seat, a coil spring within the chamber contacting the ball, and a means of elevating the coil spring, wherein the means holds the coil spring above the second chamber end.

Another object is a valve dispensing assembly, wherein the means is a plurality of legs extending from said coil spring. The legs would support the spring and provide a low profile for the fluid flow. An alternative object is a valve dispensing assembly, wherein the means is a plurality of individual elevated standoffs forming a spring seat.

Yet a further object is a valve dispensing assembly, wherein the chamber is funnel shaped.

Additionally, an object is a valve dispensing assembly, further comprising a means of guiding the coil spring. The guiding means includes angled elevated standoffs and the angled walls on the standoffs.

And another object is a valve dispensing assembly, wherein the valve dispensing system is used for dispensing powders or for dispensing liquids.

An object of the invention is a valve dispensing assembly comprising a ball check valve chamber with a first chamber end and a second chamber end, a ball seat at the first chamber end and a spring seat at the second chamber end, a coil spring contacting the spring seat at a first spring end, a ball contacting the ball seat and contacting a second spring end of the coil spring, and a plurality of individual elevated standoffs forming the spring seat.

Other objects includes a valve assembly, wherein the plurality of standoffs is three or four. Additionally, the plurality of standoffs can be integral part of the chamber and are molded with the chamber in production. Alternatively, the plurality of standoffs can be a separate insertable component. The standoffs can be a molded to have an inner ring at the spring seat joining the individual standoffs. The inner ring would be elevated from the spring seat allowing smooth liquid flow. An outer joining ring forming a circle is also possible is the profile is smooth and perhaps engages a mating indent in the inner chamber wall.

And another object is a valve dispensing assembly, wherein the plurality of elevated standoffs have radial surfaces.

A further object is a valve dispensing assembly, wherein the coil spring has a single closed coil loop on the first spring end and the second spring end.

An object of the invention is a valve dispensing assembly comprising a ball check valve chamber with a first chamber end and a second chamber end, a ball seat at the first chamber end and a spring seat at the second chamber end a coil spring with a first spring end contacting the spring seat, wherein the coil spring has a single closed coil loop on the first spring end. There is a ball contacting the ball seat and contacting a second spring end of the coil spring, wherein the coil spring has a single closed coil loop on the second spring end, and a spring guide member adjacent the spring seat.

An additional object is a valve dispensing assembly, wherein the spring guide member is an angled portion of the chamber. The spring guide member may also be an angled elevated standoff A final object is a valve dispensing assembly, wherein the single closed coil loop of the first spring end is perpendicular to the spring seat.

Other objects, features and advantages are apparent from description in conjunction with the accompanying drawings.

BRIEF DESCRIPTION OF THE FIGURES

FIG. 5B top view of dimensional characteristics of the spring, ball and valve chamber.

DESCRIPTION OF THE PREFERRED EMBODIMENT

Figure 1:
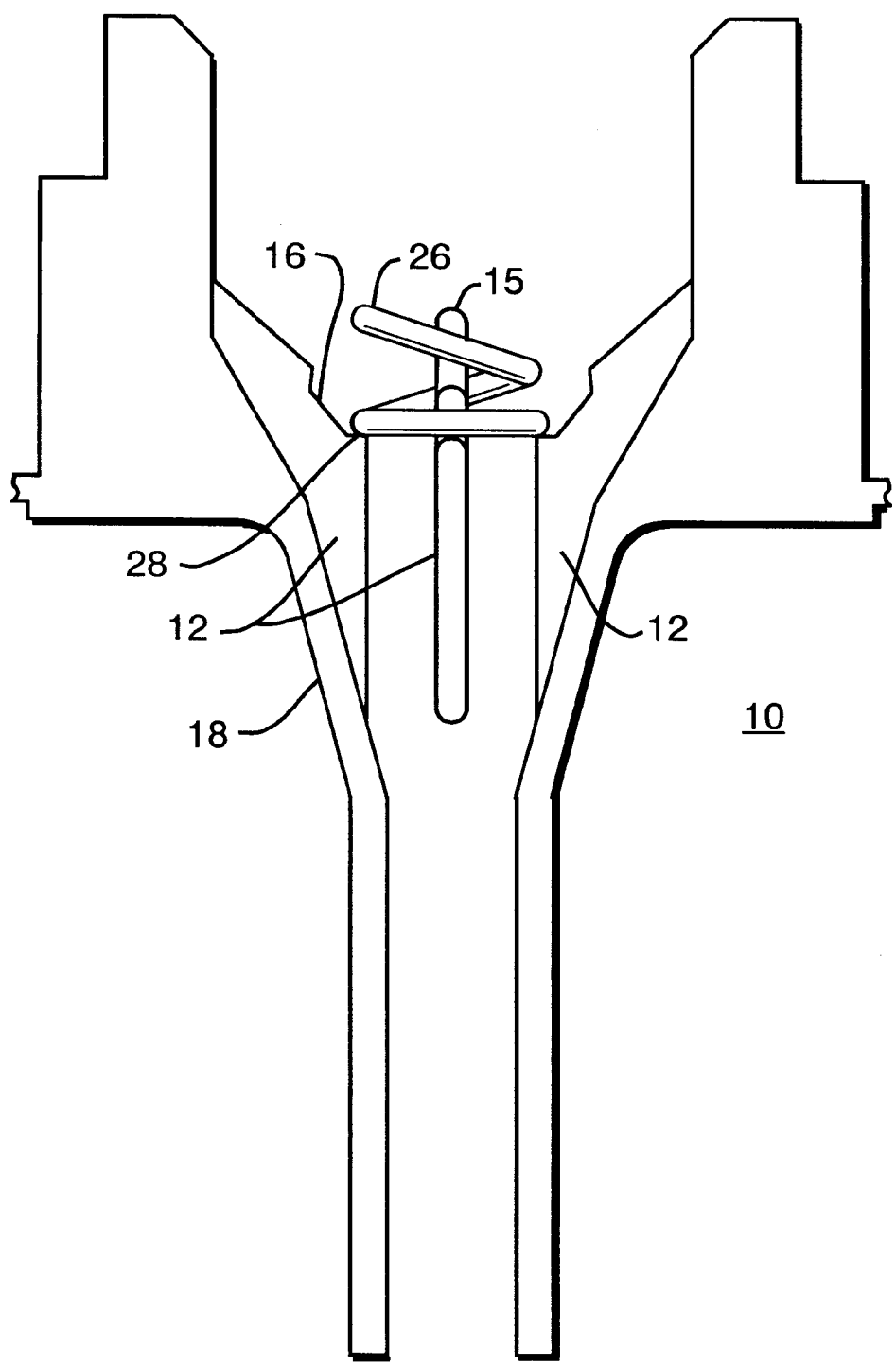
FIG. 1 is a split view of the valve dispenser, showing the elevated spring seat standoff and funnel shape.

FIG. 1 depicts the dispenser valve assembly 10 of the present invention in a split view, clearly illustrating the individual standoffs 12. There are a plurality of standoffs 12 in order to hold the spring 26 securely, and four standoffs 12 are used in the preferred embodiment. The spring 26 rests in the spring seat 28. In the preferred embodiment there is a small angled wall 16 of the standoff 12, which serves the dual function of enhancing fluid flow and providing a means for retaining the spring 26.

The bottom section of the dispenser valve 10 is shaped as a funnel 18 to aid in the flow of the liquid through the device. The standoffs 12 are specifically manufactured to minimize their effects on the liquid flow. The standoffs 12 are relatively narrow and are especially streamlined with a radial outer surface 15 to minimize turbulence to the liquid flow and otherwise direct the fluid and to impose negligible losses to the liquid flow.

The standoffs 12 can be manufactured into the dispenser valve 10 design, which is the preferred embodiment. Alternative embodiments that optimize the liquid flow path through the valve 10 and avoid being screened through the spring 26 are also within the scope of the invention. The standoffs can be a separate unit that is placed into the valve 10 and held by press-fit means, or merely held in place by the spring 26. A further alternative is to provide standoffs incorporated into the spring 26 design, by manufacturing legs onto the spring or otherwise installing a standoff 12 attachment that secures to the spring 26. The liquid flow is improved by optimizing the cross-sectional flow area and minimizing obstructions in the flow path, and there are a variety of means available to elevate the spring and allow unrestricted flow.

The angled portion of the spring seat 16 is a feature of the present invention and allows efficient seating for the assembly process. Once the spring 26 is inserted into the chamber, it falls into place on the spring seat because it is guided by the angled elevated standoffs 12 and the angled wall 16.

The present invention utilizes a single closed loop on both ends of the coil spring 26, and the single closed loop is at a different angle than the other inner coils, essentially perpendicular to the ball 22 and spring seat 28. The single outer coils are designed to seat the ball 22 on a first end and provide proper seating on the spring seat 28 on a second end.

Figure 2:
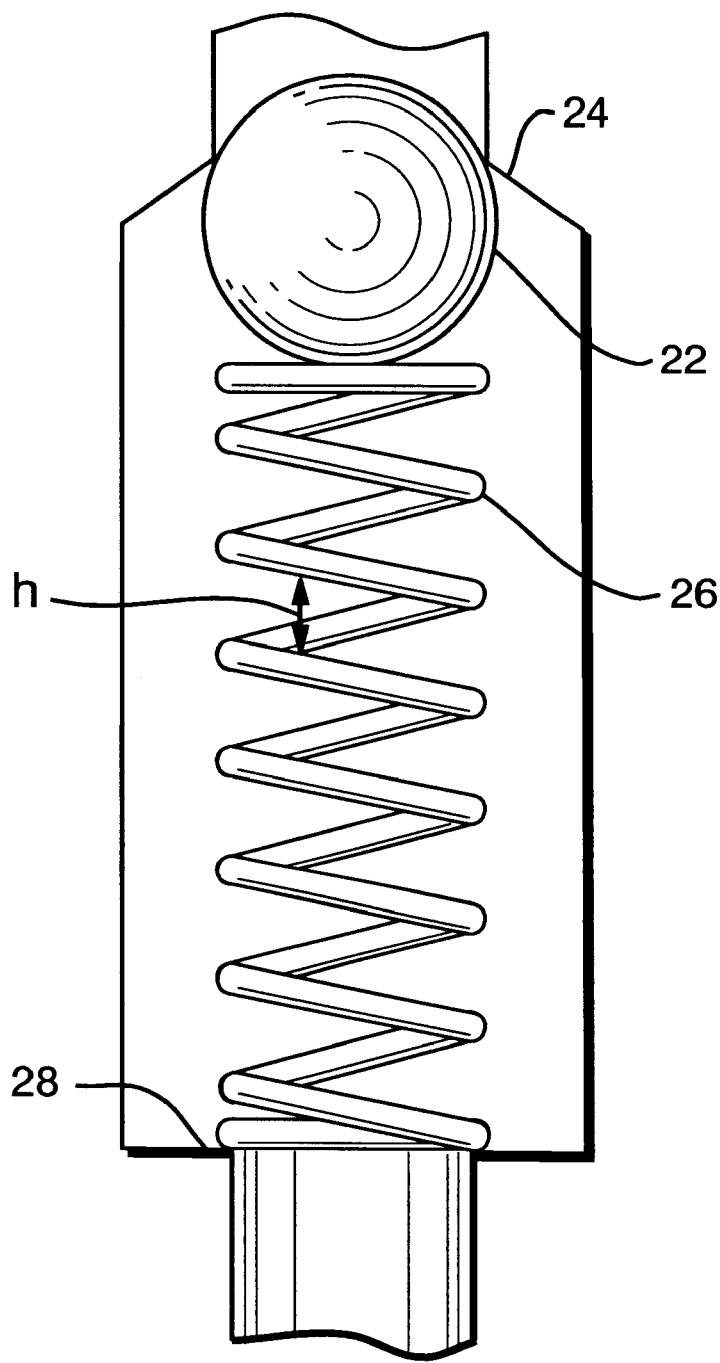
FIG. 2 is a view of a prior art ball check valve, with the spring keeping the valve closed.

FIG. 2 shows one prior art embodiment dispenser valve with the ball check valve assembly. In this view, there is not enough pressure to displace the ball 22, and the ball 22 remains in the ball seat 24. The spring 26 is fully extended, and the distance between adjacent coils is shown as distance h. The lower end of the assembly forms the spring seat 28, and the lower end of the spring 26 contacts the spring seat 28. The ball 22 rests in the uppermost coil of the spring 26. The dimensions of the ball 22 and the spring 26 vary by manufacturer.

Figure 3:
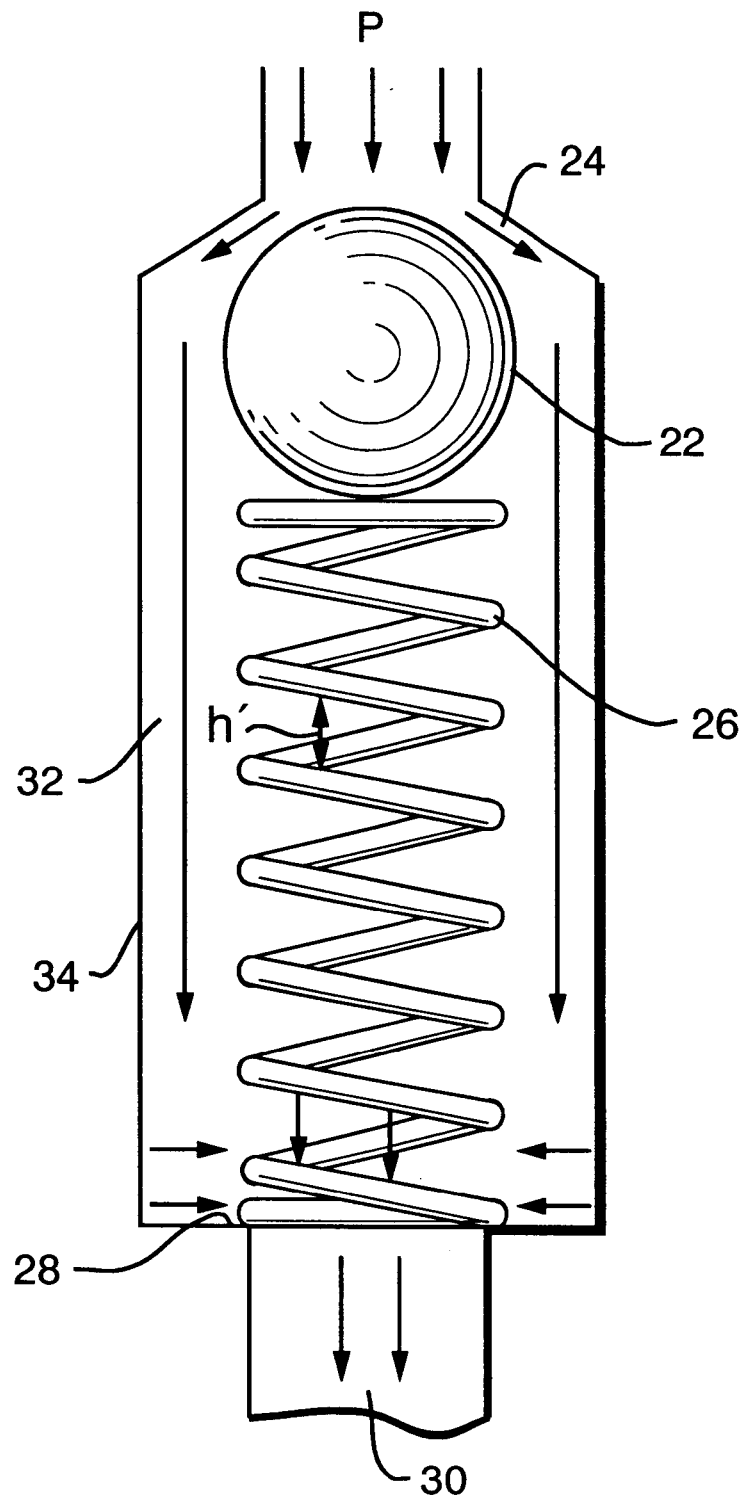
FIG. 3 is a view of a prior art ball check valve, with the ball displaced and the valve opened.

In FIG. 3, there is sufficient pressure P, to displace the ball 22 from the ball seat 24. The spring 26 is compressed, and a new distance h' is created between adjacent coils. The new distance h' is less than the original distance h, increasing the resistance to liquid flow through the spring 26. The coil separation is a factor of the spring qualities and the pressure P exerted by the liquid flow. In most cases, the pressure is directly proportional to the force exerted by the user in pressing a manual lever of a soap dispenser.

In prior art operation, the liquid flows around the ball 22 and enters the cavity between the outer dimensions of the spring 26, and the inner dimension of the inner chamber wall 34. As the liquid travels towards the check valve from the pouch or container housing the liquid, it is forced to change direction upon encountering the ball 22 surface and flows in the space between the ball seat 24 and the ball 22. The liquid then flows down the cavity 32 between the spring 26 outer diameter and the inner wall 34.

The liquid next encounters the spring seat 28 and is forced to merge into the interior of the spring 26. There is some turbulence and disjointed liquid flow at this juncture. After merging into the spring center through the narrowed coil distance h'. The liquid then changes direction again and is forced through the exit orifice 30. In summary, the liquid is forced to change direction several times, resulting in an inefficient and restricted flow under the laws of fluid dynamics.

Another problem related to using the spring assembly is that the spring 26 acts as a strainer. Particulate matter accumulates in the cavity 32 near the spring seat 28. The width of the spring coils 26 and the distance between the compressed coils h' determine the amount of resistance to liquid flow. Eventually, the particulate builds up in the free space region 32 and eventually completely freezes the spring assembly. Upon this catastrophic failure, the unit is thrown away, including any liquid portion still in the pouch, because it is too difficult to unclog the valve dispenser 10.

Using standard principles of fluid energy, a fluid can possess energy in three forms (disregarding thermal energy)—pressure, kinetic, or potential energies. Bernoulli's equation is basically an energy conversation equation. The total energy of a fluid flowing without losses in a pipe or chamber cannot change. According to Bernoulli's equation—total energy possessed by a fluid is the sum of its pressure, kinetic and potential energies.

$$p_1/\rho + v_1^2/2g_c + z_1 = p_2\rho + v_2^2/2g_c + z_2$$

p=pressure
ρ=density
v=velocity
$g_c$=gravitational constant
z=height above datum In fluid dynamics, energy conservation principles based on Bernoulli's equation are derived to include the frictional loss in the system as well as other internal losses. The frictional loss generally refers to the restricting properties of the materials through which the fluid flows. The other loss properties include obstructions in the flow, changes in direction, and changes in flow area. The losses lower the efficiency of a system, and are described as:

$$(p_1/\rho + v_1^2/2g_c + z_1) + h_A = (p_2/\rho + v_2^2/2g_c + z_2) + h_E + h_f$$

$h_A$=Fluid height, head, depth—Added
$h_E$=Fluid height, head, depth—English, extracted
$h_f$=Fluid height, head, depth—friction, flow In the liquid dispenser systems, losses decrease the operating efficiency of the dispenser, and require a greater input force to counter these losses. There are inherent losses attributable to all dispensers and refer to the material used in the dispenser design. There are also losses that can be reduced for obstructions and dimensional restrictions. Furthermore, properly designed fluid paths reduce the inefficiency attributable to turbulence.

In the prior art as shown in FIG. 3, the liquid flows around the ball 22 and enters the free space region 32 between the spring 26 and the inner wall 34. The flow then encounters a substantially flat surface at the spring seat 28, and is forced to change direction. The change in direction is essentially 90°, and introduces a loss into the system.

The liquid is then directed towards the compressed spring 26. The spring coils are an additional loss factor that is added to the other losses. Depending on the size of the individual spring coils and the distance between each coil, the loss factor can be substantial, especially with the compressed coils illustrated in FIG. 3.

The liquid must then change direction again, essentially 90°, before it flows through the exit orifice 30. This additional change in direction is an additional loss added to the prior losses.

The prior art dispenser valves have several directional changes, obstructions, and turbulence create significant losses, and these various losses combine to produce an inefficient flow system. The inefficiency requires a greater input force to overcome these losses, such as a greater force on the dispenser push bars. The greater force requires a more robust system to tolerate the additional force and is more prone to maintenance and failure.

The spring 26 also acts as a strainer, and particulate matter that is part of the liquid is strained and accumulates outside the spring 26 and builds up on the spring seat 28. As the accumulation builds up in the outer chamber 32, the performance of the dispenser decreases and eventually has a catastrophic failure, where the valve 10 is completely clogged. The particulate matter also accumulates between the compressed coils and effectively block that portion of passage.

Figure 4A:
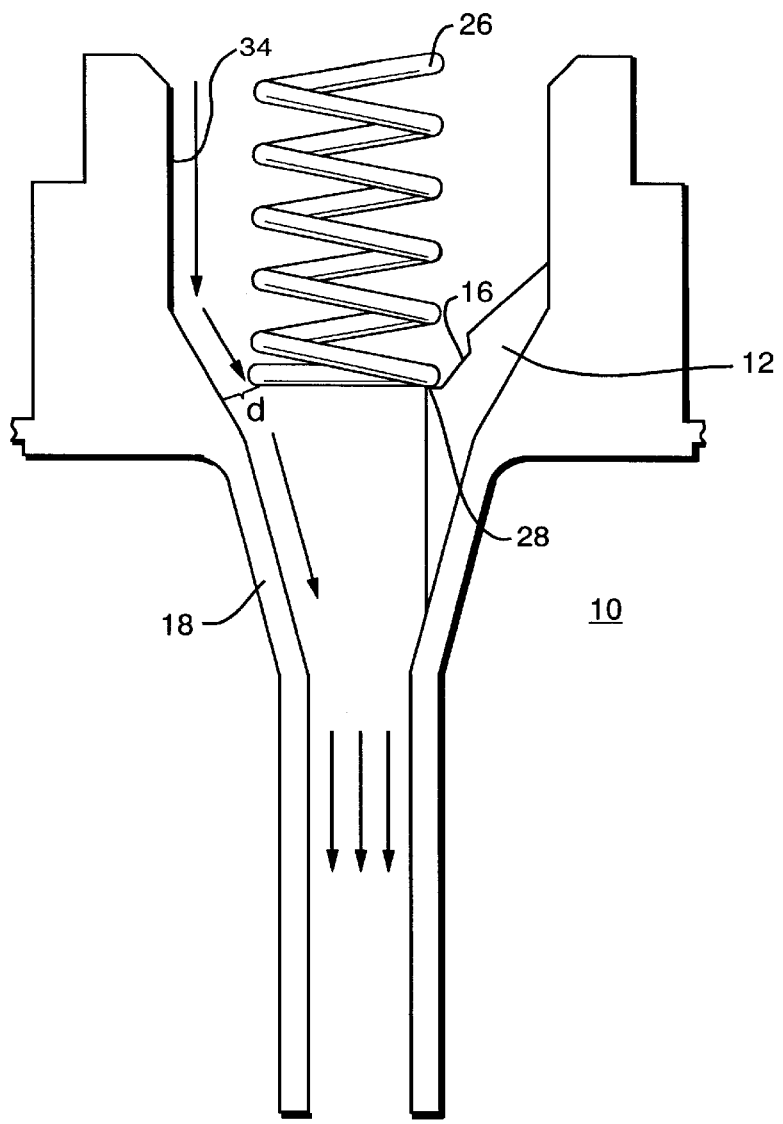
FIG. 4A is a view of the valve dispenser, showing the elevated spring seat standoff and funnel shape, with the liquid flow path illustrated.

FIG. 4A is an illustration of the improved dispenser valve assembly 10 of the present invention, showing the spring 26 placement and the liquid flow with one standoff 12 removed for illustrative purposes. The unobstructed path between the inner wall 34 and the spring 26 at the spring seat is shown as distance d, which will be substantially the entire circumferential region minus the width of the standoffs 12 as illustrated in the top view. In the preferred embodiment the width of the standoff is 0.022 inches. Even when multiplied by four standoffs 12, the total obstruction caused by the standoff width represents only a minor fraction of the overall free space in the ball check valve chamber 10.

Figure 4B:
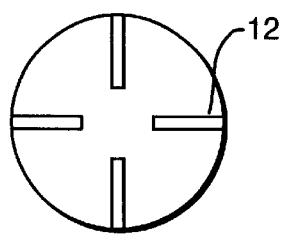
FIG. 4B is a top view of the valve dispenser, showing the elevated spring seat standoffs.

The top view of FIG. 4B shows the preferred placement of the standoffs 12 within the ball check valve chamber of the dispenser valve assembly 10. In the preferred embodiment there are four standoffs 12 symmetrically placed about the chamber. The upper portion of the standoff is notched by a flush or angled cut to improve flow characteristics and receive the lower section of the spring 26. All surfaces of the standoff 12 are streamlined with radial surfaces to minimize turbulence and facilitate the liquid flow.

A fewer number of standoffs 12 would increase the overall flow capacity and is within the scope of the invention. Three standoffs 12 is an obvious variation that would permit sufficient retention of the spring 26 while further decreasing the amount of material in the design and lowering the flow restrictions. The angled cut 16 of the standoff 12 allows for easier placement of the spring and enhanced flow characteristics, but a flush cut is also permissible.

The distance, d, between the lowest spring coil and the inner wall 34 of the chamber allows the liquid to flow through the dispenser valve assembly 10 without significantly changing direction and without being forced or strained through the compressed spring 26. The elimination of the losses attributable to the change in direction of the fluid flow and the obstruction of the compressed spring greatly enhances the flow capacity and improves the efficiency of the device.

The distance, d, also allows larger size particulate matter to pass through the assembly 10, especially larger sized grit particulate. Prior dispensers forced particulate matter through the compressed spring, as illustrated in FIG. 3. The distance, h', and the width of the coils were limiting factors in the liquid flow and type of product that could be dispensed, larger particles were strained and clogged the outside chamber 32 of the device by forming a ridge upon the spring seat 28. The present invention eliminates the need for the liquid to enter into the spring 26 center and engage the compressed spring coils. The present invention does not preclude the liquid from entering and exiting through the center of the spring 26, but provides an additional path 32 unencumbered by directional changes or obstructions.

Another feature of the present invention is the funnel shaped lower end 18 of the ball check valve chamber. The funnel shape 18 starts well above the exit orifice 30, and diverts the liquid flow to the orifice 30 without introducing significant losses experienced by prior art designs. The funnel shape 18 has angled sections to produce the funnel shape, but curved surfaces are within the scope of the invention. The elevated standoffs 12 are also tailored to minimize their effect and all outer surfaces are rounded and sloped to limit flow losses. These standoffs also serve to divert the liquid into the exit nozzle 30.

The present device not only can handle more viscous liquids and larger size particulate matters, but also greatly reduces the clogging of the valve assembly. The liquids of the prior assemblies would accumulate and build up near the spring seat 28 and lower spring coils, which coils provided a convenient surface for such build up of materials. With larger particulate materials, more viscous liquids, and liquids with certain congealing properties, the problem is exacerbated. This clogging would decrease the flow capacity and generally make the device difficult to operate. Eventually, the spring center region and the exit orifice 30 would become impassible. The present invention enhances the liquid flow characteristics and creates a relatively maintenance-free device.

Figure 5A:
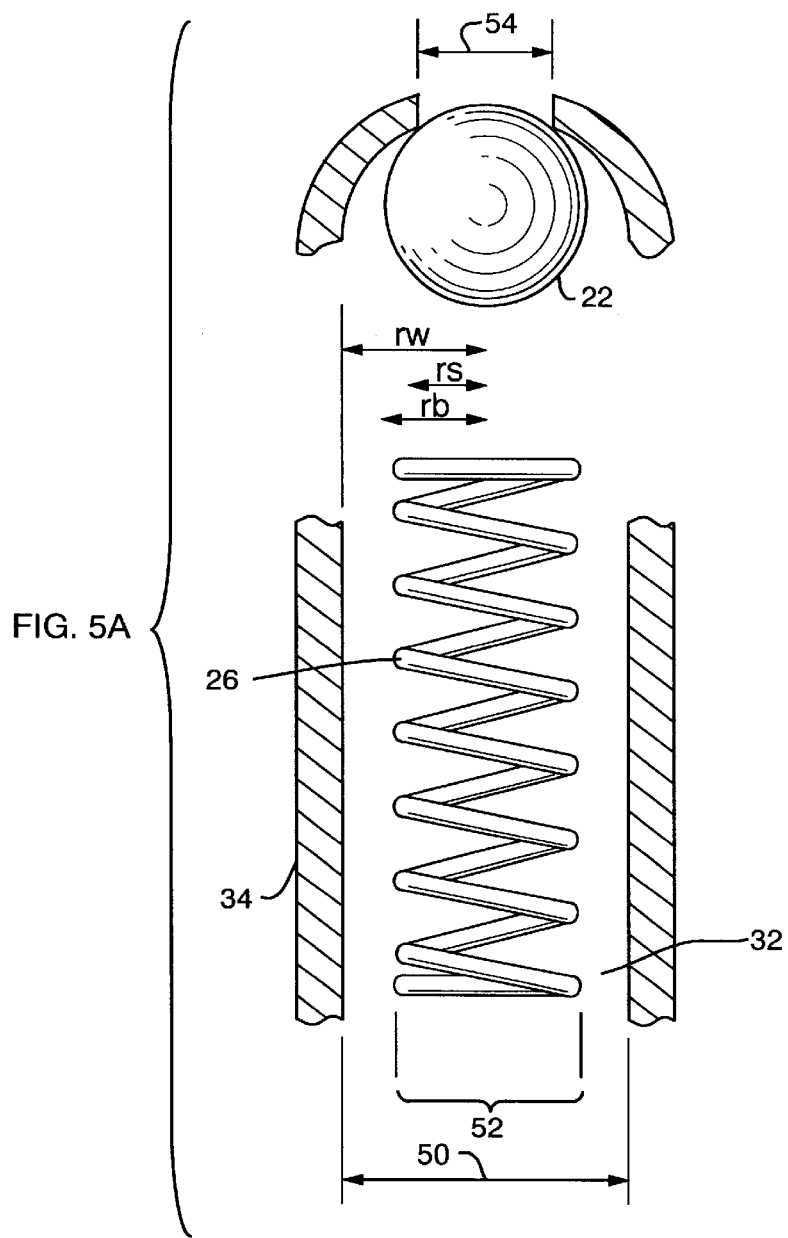
FIG. 5A split view of dimensional characteristics of the spring, ball and valve chamber.
Figure 5B:
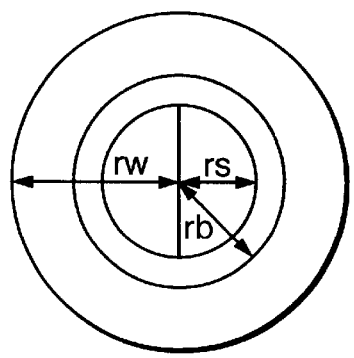

The dimensions of the assembly components are shown in FIGS. 5A and 5B. The radii of the various components are expressed as follows: $r_w$=radius of the inner wall 34; $r_s$=radius of the spring 26; $r_b$=radius of the ball 22. The dimensions of these elements vary by manufacturer, but the spring or chamber free space 32 is derived from the spring cavity 50 minus the spring outer diameter 52.

The size of the ball 22 also plays a role in the liquid flow, as the ball free space between the ball 22 and the inner wall 34 may be less than that of the spring free space 32, creating a restriction in the flow. FIG. 3 illustrates the liquid flow path around the ball 22. The optimal 10 system is configured so that the spring constant and force are such that the ball free space is maximized.

The spring or chamber free space 32 is particularly important because it allows for the optimal flow of liquids through the dispenser 10. The spring free space 32 area is calculated by the area difference between the spring 26 and the inner wall 34 of the housing, and the area values are derived from the algebric formula for the area of a circle —$A=\Pi r^2$.

The following chart depicts approximate dimensions of the various elements of the dispenser valves of the present invention.

| Inner Wall | Ball Size | Inlet Hole | Spring Size |
|---|---|---|---|
| .194" | .156" | .128" | .148" OD |

The inner wall dimensions are alternatively referred to as the spring cavity or the ball seat ID.

Inner Wall/Chamber cavity $A=\pi r^2$ $A=3.14 (0.097")^2$ $A=0.02956"^2$ which is the area of the chamber Spring $A=\pi r^2$ $A=3.14 (0.074")^2$ $A=0.01720"^2$ which is the area of the spring The spring free space of the present invention is the numerical difference between the area of the chamber and the area of the spring, or $0.02956"^2 - 0.01720"^2 = 0.01236"^2$.

In the present invention, the area of the free space region, $0.01236"^2$ is more than 40% of the overall flow area. The elevated standoffs allows the liquid to flow through this region in an easy and efficient manner.

In addition, the inlet hole 54 is a restricting point for all designs. The present invention can employ a larger inlet hole 54 to provide a greater flow rate and larger particulate matter. The exit nozzle or fitment also can be sized to allow greater flow capacity.

Although the flow area is one factor to consider, another important factor is providing unrestricted flow throughout the design so that a bottleneck is not produced. The prior art designs all had bottlenecks in the designs because the liquid was forced to flow through the spring coils. The restriction is further aggravated when the coils of the spring are compressed or wound tighter.

Figure 6A:
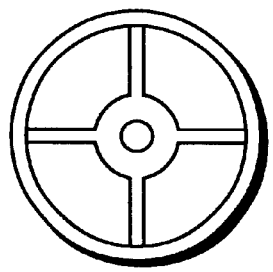
FIG. 6A shows a top view of prior art tip design.
Figure 6B:
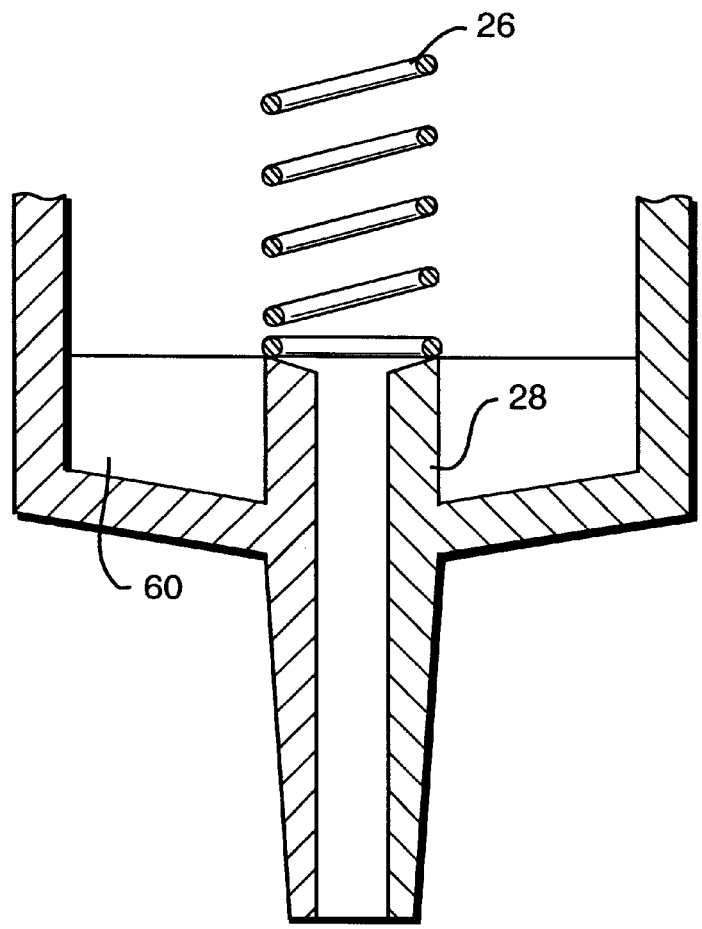
FIG. 6B shows a split view of prior art tip design.

FIGS. 6A, B, C, D shows two of the prior art product tip designs. The design of FIGS. 6A and 6B shows the spring seat elevated without a completely sealed standoff 28, creating a pocket 60 in the free space region 32 around the elevated potion. There is no direct flow access, and the pockets 60 create a region for build up of material that leads to increased clogging. All liquid in this design must flow through the compressed spring 26 in order to exit the device. The liquid flow in this design is particularly poor, as the change in direction and blockage increases with the elevated closed central seat standoff 28.

Figure 6C:
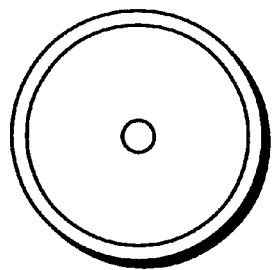
FIG. 6C shows a top view of prior art tip design.
Figure 6D:
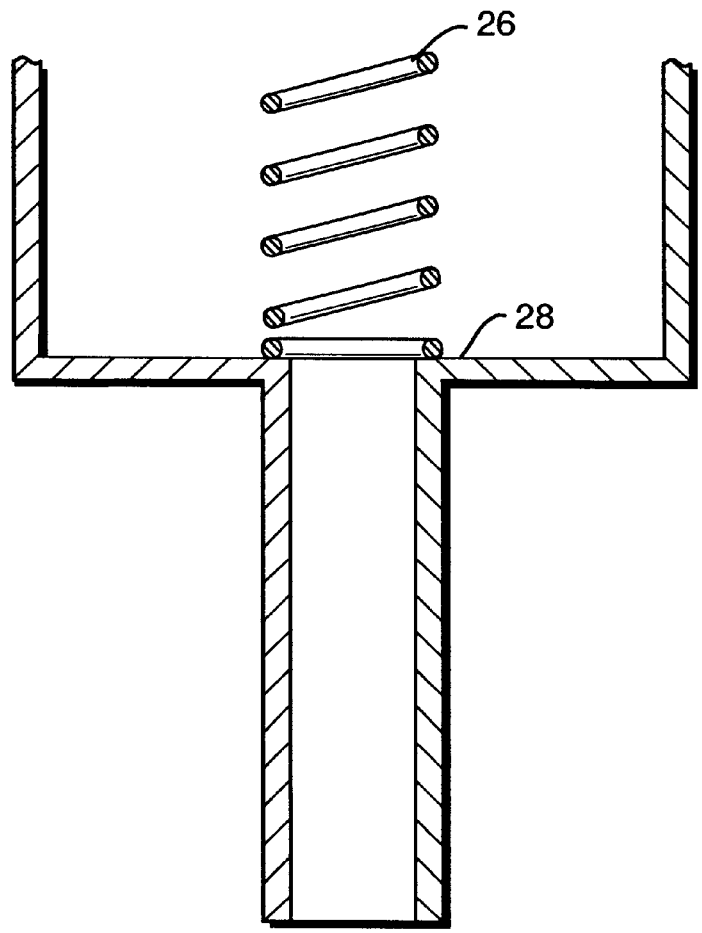
FIG. 6D shows a split view of prior art tip design.

The prior art design of FIGS. 6C, and 6D shows the flush spring seat and the spring resting on that seat. There are no standoffs 28, no funnel-shaped walls, and no guiding walls for the spring 26. All liquid must flow through the spring 26 to exit the nozzle. The directional changes and obstructions from the compressed spring 26 decrease flow capacity and limit the usage dispensing of liquids containing grit or other particulate matter.

In operation, the liquid soap is housed in a pouch of a bag-in-box system, cartridge, or container, and some mechanical means is used to put pressure on the pouch, cartridge or container. Without little or no pressure, the ball 22 is seated in the ball seat 24 by the spring 26 and no liquid can enter the dispenser valve 10. When the pressure from the liquid exceeds the spring tension, the ball 22 is displaced from the ball seat 24 and the liquid flows down the free space region 32 between the spring 26 and the inner wall 34. A metered quantity of liquid travels down through the dispenser assembly 10 and flows along the funnel shaped chamber walls 18 out through the nozzle of the exit orifice 30.

The foregoing description of the preferred embodiment of the invention has been presented for the purpose of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

The invention is susceptible of many variations, all within the scope of the specification, figures, and claims. The preferred embodiment described here and illustrated in the figures should not be construed as in any way limiting.

What is claimed is:

1. A valve dispensing assembly comprising:
   a ball check valve chamber with a first chamber end and a second chamber end;
   a ball seat at said first chamber end;
   a ball contacting said ball seat;
   a coil spring within said chamber contacting said ball; and
   a means for elevating said coil spring, wherein said means holds said coil spring above said second chamber end, towards said ball seat.

2. A valve dispensing assembly according to claim 1, wherein said means is a plurality of legs extending from said coil spring.

3. A valve dispensing assembly according to claim 1, wherein said means is a plurality of individual elevated standoffs forming a spring seat.

4. A valve dispensing assembly according to claim 3, wherein said plurality of elevated standoffs are angled.

5. A valve dispensing assembly comprising:
   a ball check valve chamber with a first chamber end and a second chamber end;
   a ball seat at said first chamber end and a spring seat at said second chamber end;
   a coil spring contacting said spring seat at a first spring end;
   a ball contacting said ball seat and contacting a second spring end of said coil spring; and
   a plurality of individual elevated standoffs forming said spring seat.

6. A valve dispensing assembly according to claim 5, wherein said plurality of standoffs is four.

7. A valve dispensing assembly according to claim 5, wherein said plurality of standoffs is three.

8. A valve dispensing assembly according to claim 5, wherein said plurality of standoffs are an integral part of said chamber.

9. A valve dispensing assembly according to claim 5, wherein said plurality of standoffs are a separate insertable component.

10. A valve dispensing assembly according to claim 5, wherein said chamber is funnel shaped.

11. A valve dispensing assembly according to claim 5, wherein said plurality of elevated standoffs have radial surfaces.

12. A valve dispensing assembly according to claim 5, wherein said coil spring has a single closed coil loop on said first spring end and said second spring end.

13. A valve dispensing assembly comprising:
   a ball check valve chamber with a first chamber end and a second chamber end;
   a ball seat at said first chamber end and a plurality of standoffs forming an elevated spring seat at said second chamber end;
   a coil spring with a first spring end contacting said elevated spring seat, wherein said coil spring has a closed coil loop on said first spring end;
   a ball contacting said ball seat and contacting a second spring end of said coil spring, wherein said coil spring has a closed coil loop on said second spring end; and
   a spring guide member adjacent said elevated spring seat.

14. A valve dispensing assembly according to claim 13, wherein said spring guide member is an angled wall of said plurality of elevated standoffs.

15. A valve dispensing assembly according to claim 13, wherein said closed coil loop of said first spring end is perpendicular to said elevated spring seat.

* * * * *